United States Patent [19]

Wojahn

[11] 4,175,485

[45] Nov. 27, 1979

[54] QUICK SMOKER

[76] Inventor: Harold F. Wojahn, 303 Ibis La., Satellite Beach, Fla. 32937

[21] Appl. No.: 955,191

[22] Filed: Oct. 27, 1978

[51] Int. Cl.² ............................................. A23B 4/04
[52] U.S. Cl. ..................................................... 99/482
[58] Field of Search ................. 99/467, 425, 422, 413, 99/481, 482, 347, 357, 445; 126/59.5

[56] References Cited

U.S. PATENT DOCUMENTS

| | | | |
|---|---|---|---|
| 1,176,720 | 3/1916 | Varian | 99/425 |
| 2,413,204 | 12/1946 | Wolff | 99/425 X |
| 2,894,448 | 7/1959 | Henderson | 99/482 X |
| 3,081,692 | 3/1963 | Sorensen | 99/482 |
| 3,611,911 | 10/1971 | Martin | 99/482 |
| 3,776,127 | 12/1973 | Muse | 99/482 |

FOREIGN PATENT DOCUMENTS 2349020 4/1975 Fed. Rep. of Germany ............. 99/482

Primary Examiner—Edward J. McCarthy
Attorney, Agent, or Firm—Dennison, Dennison, Meserole & Pollack

[57] ABSTRACT

A portable food smoker incorporating a cast aluminum base and a lid, of generally dome-shaped configuration, received over the base and defining an interior chamber therewith. The base includes a lid supporting side wall, a moisture retaining groove inwardly thereof, and multiple stabilizing and supporting ribs. The chamber is adapted to receive a drip pan and meat rack supported on the base ribs. The assembly can be completed by a base elevating support and fuel accommodating containers.

9 Claims, 3 Drawing Figures

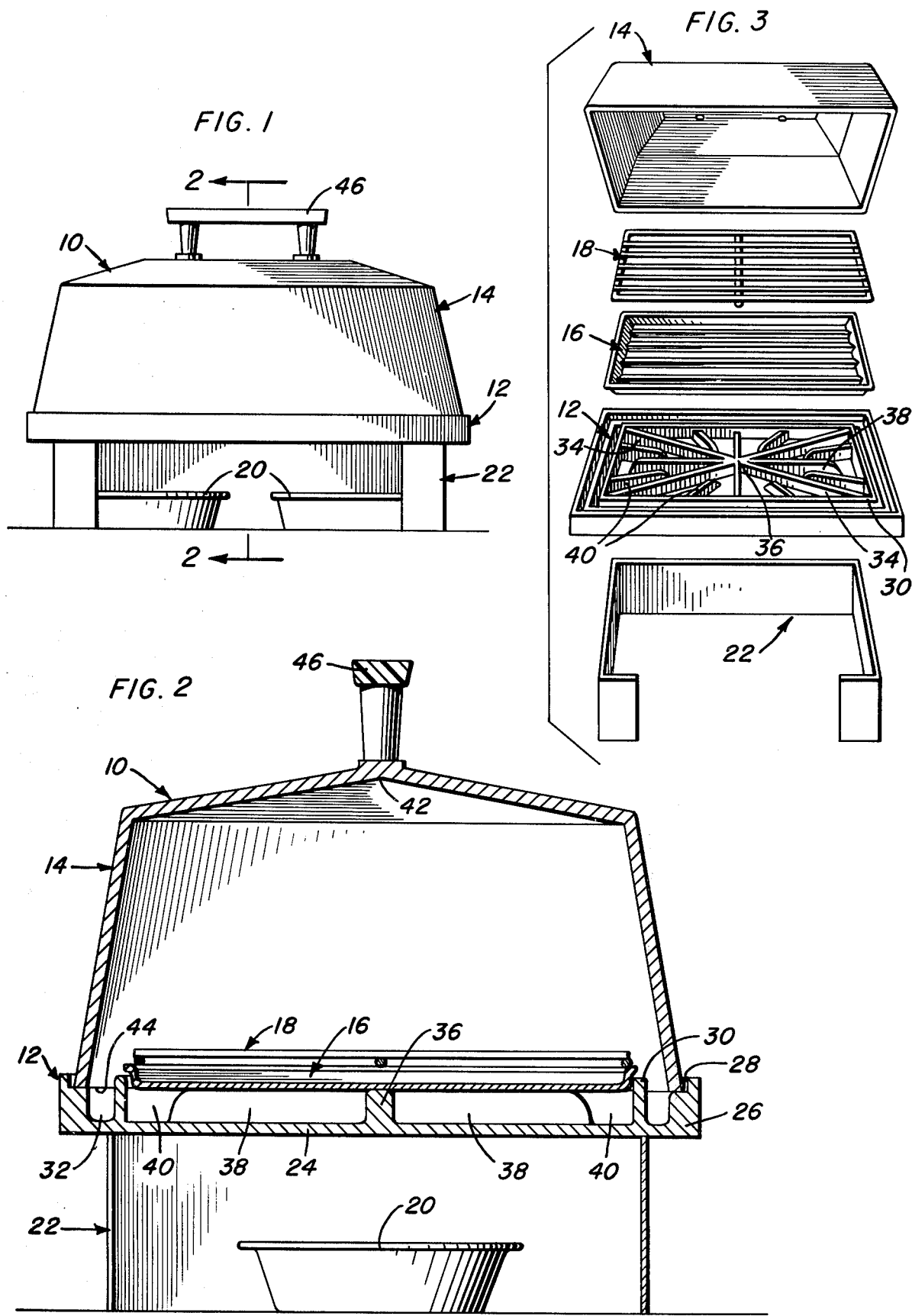

QUICK SMOKER

BACKGROUND OF THE INVENTION

The invention herein is generally concerned with the cooking of foodstuffs, such as sea food, meat and the like, and more particularly relates to apparatus specifically adapted for cooking in the manner referred to as smoking. This basically involves, in conjunction with the heating of the food, the subjecting of the food to a rather dense smoky atmosphere so as to impart the desirable smoked flavor to the food. Any appropriate aromatic wood, such as hickory, can be used to generate the smoke.

Heretofore, the smoking of food has normally involved the use of rather substantial apparatus, sophisticated heat supply and distribution systems, and the expenditure of much time and effort. The resultant product, in turn, was usually produced in such quantity as to require specific storage facilities until such time as the product could be used.

Some prior efforts have been directed toward providing compact smokers which can cook, or more particularly smoke, small quantities of foodstuffs. However, such units are distinctly lacking in those features which one would desire in a portable smoker usable, as an example, directly at a camp site or fishing site. In this regard, the known smokers, even those which might be considered portable, are awkward complex structures requiring, at least in some cases, a sophisticated power source, such as electricity, and which require an inordinate amount of time to produce what in most cases is a less than satisfactory final product.

The following patents constitute the most pertinent prior art known to applicant:

| U.S. Pat. No. | INVENTOR | ISSUE DATE |
| --- | --- | --- |
| 2,573,772 | NYSTEN | November 6, 1951 |
| 2,789,877 | PFUNDT | April 23, 1957 |
| 2,894,448 | HENDERSON ET AL | July 14, 1959 |
| 3,081,692 | SORENSEN | March 19, 1963 |
| 3,333,526 | KIRKPATRICK | August 1, 1967 |
| 3,517,602 | HORTON | June 30, 1970 |
| 3,776,127 | MUSE | December 4, 1973 |

The cookers or smokers presented in these prior art patents do not incorporate the structural simplicity of the apparatus of the present invention, nor do they incorporate the specific unique features, as shall be described presently, which enable the production of a smoked product which is highly acceptable to both taste and sight. Likewise, the known smokers appear to require a substantial length of time, running up to several hours, to arrive at a properly smoked product. This is directly contrary to applicant's apparatus wherein sea food is expertly and completely smoked within approximately twenty minutes with other meat products requiring only approximately forty minutes.

SUMMARY OF THE INVENTION

The smoker of the present invention includes two basic components, a cast aluminum base and a cast aluminum lid cooperatively engaged with and mounted over the base so as to define an internal chamber. The base includes an upstanding peripheral wall with a support ledge defined in the upper edge thereof for receipt of the lower edge of the lid. A moisture retaining groove is provided peripherally about the base immediately inward of the side wall. The lid in turn is of a generally dome-shaped configuration whereby the moisture collecting on the inner surface thereof, rather than dropping directly on the meat and adversely affecting both the color and taste thereof, follows the sloping configuration of the lid down to the moisture retaining groove about the base. The bottom panel of the lid is approximately 3/16" thick, this thickness having been found to be best so as to provide for an effective transfer of heat, while at the same time being able to sustain, without melting, the temperatures required. The base is completed by a plurality of upstanding ribs extending outward along generally radial lines from the center point of the bottom panel. These ribs rigidify the relatively thin bottom panel, substantially increase the heat transmitting surfaces, provide compartments for reception of the wood dust, and provide a support surface for the drip pan and meat rack received within the defined chamber.

The smoker, as above-described, can be used on a conventional two-burner camp stove. Alternatively, and as illustrated in the drawings, a base support can be provided so as to elevate the base and lid for the placing of a pair of containers thereunder. These containers will normally be conventionally available aluminum foil pots and will be filled with denatured solvent alcohol which, when ignited, provides the desired heat source. As will be noted, the support base has a relatively wide open side therein so as to provide combustion supporting air while at the same time acting as an effective wind shield.

It has been found that due to the effective heat transfer capabilities of the base, and the pressure increasing generally sealed nature of the chamber, a completely smoked product can be provided within twenty to forty minutes. As such, and because of the compact size of the smoker, the smoker finds particular adaptability for use in preparing a single meal wherever desired, that is either at home, at a camp site, or directly at a fishing site.

BRIEF DESCRIPTION OF DRAWINGS

FIG. 1 is a front elevational view of the portable smoker of the present invention;

FIG. 2 is an enlarged cross-sectional view taken substantially on a plane passing alone line 2—2 in FIG. 1; and FIG. 3 is an exploded perspective view of various of the components of the smoker.

DESCRIPTION OF THE PREFERRED EMBODIMENTS

Referring now more specifically to the drawings, reference numeral 10 is used to designate the quick smoker comprising the present invention. The primary components of the smoker 10 are the base 12 and the lid 14, both preferably formed of cast aluminum. The base and lid combine to define an enlarged smoking chamber within which is positioned a drip pan 16 and overlying food or meat rack 18.

The above-described construction is associated with an appropriate heat source. This can be either a two-burner camp stove with the base resting directly on the burners, or a pair of fuel containers 20 over which the base is supported by a base support 22.

Turning specifically to the base 12, it should be appreciated that while a rectangular configuration is preferred, the principles of the invention will apply to bases of other configurations. In construction, the base includes a planar bottom panel 24. A peripheral side wall 26 rises from the outer edge of the base panel 24 completely thereabout and has an inwardly directed lid supporting ledge 28 defined in the upper edge thereof. This ledge 28 is so configured as to specifically orient the lid 14 relative to the base 12 and preclude any lateral shifting or misalignment therebetween.

A vertically extending partition wall 30 is integrally formed with the bottom panel 24 and projects upwardly therefrom in inwardly spaced relation to the side wall 26. This partition wall 30 extends completely about the panel 24 and defines, with the parallel side wall 26, a continuous moisture retaining groove or channel 32.

The base is completed by a plurality of elongated vertically projecting ribs formed integrally with the bottom panel 24. As will be best appreciated from FIG. 3, four of the ribs 34 project outwardly from the center point 36 of the bottom panel 24 to the four corners defined by the partition wall 30. Four of the ribs 38 also project from the central point 36 toward the mid-point of each of the four wall sections which define the partition wall 30, terminating short of these wall sections. Finally, a rib 40 extends inwardly from the partition wall 30 centrally between each set of adjacent ribs 34 and 38, the ribs 40 terminating short of the central point 36.

These ribs 34, 38 and 40 perform multiple functions, most significantly of which is reinforcement of the relatively thin bottom panel 24 and substantial enhancement of heat transfer to the wood dust normally used to effect the desired smoking. The ribs also define compartments to facilitate an equalized distribution of the wood dust. Finally, as will be readily apparent, the ribs define the actual support for the drip pan so as to maintain the pan vertically spaced from the bottom panel 24 for the accommodation of the wood dust therebetween.

As previously mentioned, a significant feature of the apparatus of the invention is the ability of the smoker 10 to effectively cook and smoke sea food and the like within approximately twenty to forty minutes. The use of cast aluminum, as well as the particular thickness of the bottom panel 24, both contribute to the effectiveness of the apparatus. For example, a base bottom panel 3/16" thick effects, in conjunction with the ribs, a positive distribution of the heat so as to achieve a rapid effective burning of the wood dust or small chips and a smoking of the product within an extremely short time as compared to more conventional smokers. This, as previously indicated, assumes use with a conventional two-burner stove or two small aluminum foil containers of denatured solvent alcohol. Any substantial increase in the thickness of the bottom panel 24 would result in a failure to efficiently transfer heat. By the same token, were the bottom panel 24 substantially thinner than the contemplated 3/16", heat sufficient to effect the desired rapid smoking would give rise to the very substantial possibility of the bottom panel melting.

Insofar as the overall size of the smoker, it is contemplated that the apparatus be approximately 12" deep from front to rear, 16" wide and 11" high, including the base support 22. Being so dimensioned, the smoker is readily adapted to smoke sufficient food for a single serving for one or a small group of people. By the same token, the smoker can easily be accommodated by either a two-burner camp stove or two small aluminum foil containers of an appropriate fuel, preferably denatured solvent alcohol. The small size of the smoker is also considered to contribute to the ability of the smoker to complete the smoking process in a heretofore unattainable short time.

Turning now to the lid 14, it is considered particularly significant that this lid 14 be of a generally dome-shaped configuration, either rounded or provided with angularly related sections as illustrated. In any case, the lid 14 must provide an inner surface which slopes continuously downwardly from a central peak line or peak point 42 in all directions to the bottom edge 44 thereof which seats on the support ledge 28. This dome-shaped lid or sloping inner lid surface assures that any moisture collecting on the inner surface of the lid will follow the sloping lid surfaces down to the support ledge and from there into the peripheral moisture retaining groove or channel 32. Were the lid 14 flat, or include a flat component over the food supporting grill 18, any moisture collecting thereon would tend to drop directly on the food. This in turn has been found, in the more conventional smokers, to both discolor the food, causing a disagreeable blackening thereof, and to have a substantial adverse affect on the taste of the food. These problems are effectively avoided by applicant's specifically configured lid and the cooperation thereof with the base. By the same token, the provision of a moisture retaining channel in the base assures the retention of sufficient moisture within the smoke chamber to maintain the desired moisture content within the food itself. Further, by a retention of the liquid within the groove or channel 32, there is no possibility of this liquid wetting the wood dust or chips positioned inward of the groove forming partition wall 30.

In order to facilitate a manipulation of the lid 14, an appropriate insulated handle 46 will be fixed thereto, preferably centrally of the upper portion thereof.

While the lid does not hermetically seal to the support ledge 28, there is close contact therebetween whereby upon a heating of the interior of the chamber there is a pressure build-up therein which substantially enhances the smoking effect on the foodstuff. Incidentally, it will be appreciated that the foodstuff is completely segregated from the heater means, whether it be a camp stove burner or a burning liquid fuel, whereby a contamination-free product results.

When using a liquid fuel heat source as illustrated in the drawings, the base 12 will seat on the base support 22. This base support 22 is essentially a rigid flat metal strip bent to form four wall sections with the opposite ends of the strip being spaced, along one section, to define an access opening through which the fuel containers 20 can be introduced and removed. Formed in this manner, the base support, in addition to maintaining the base 12 and lid 14 elevated, also provides an effective wind shield.

In order to properly position and support the food within the smoker, an aluminum foil drip pan 16 will be positioned on the ribs 34, 38 and 40, and a metal grill or rack 18 will in turn be supported on the pan 16. As will be readily apparent, the rack will be slightly elevated from the base of the pan by any appropriate means, for example, through small legs formed on the rack, or by ribs formed within the pan itself, this latter arrangement being illustrated in the drawings. The pan is to be of a size so as to collect the drippings from the food and thus further assist in maintaining the wood dust or chips dry.

From the foregoing, it is to be appreciated that a unique portable smoker has been defined. The smoker, particularly through the unique construction of the base and cooperating lid, is capable of producing a smoked product in from twenty to forty minutes. Other advantages of the smoker reside in the capability of the smoker to cook and smoke single servings, thus particularly adapting the smoker for use directly at camp sites, fishing sites, and the like. Structurally, the smoker is considered unique in its basic simplicity and in the corresponding convenience involved in both the set-up of the apparatus and any subsequent cleaning thereof which may be required. With regard to the clean-up, this basically involves a dumping of the wood ash from the base and a cleaning of the rack and drip pan. Even a cleaning of the drip pan may be avoided by merely a lining of the pan with aluminum foil which can subsequently be discarded.

The foregoing is considered illustrative of the principles of the invention. It is to be appreciated that all suitable modifications and equivalents may be resorted to, falling within the scope of the invention as claimed.

I claim:

1. In a portable food smoker, a base and a cooperating lid, said base comprising a planar bottom panel, a side wall projecting inwardly from said bottom panel peripherally thereabout, said side wall having a top edge, an inwardly directed support ledge defined along the top edge of the side wall, a partition wall projecting upwardly from said bottom panel in inwardly spaced generally parallel relation to said side wall, said partition wall being generally coextensive with said side wall and defining a moisture retaining channel between the partition wall and the side wall inwardly of said support ledge, said lid being of a generally dome-shaped configuration and including a peripheral lower edge adapted to seat directly on said support ledge completely about said base whereby moisture collecting within said lid will travel downwardly for collection within said moisture channel.

2. The apparatus of claim 1 including multiple upstanding ribs projecting upwardly from said bottom panel within said peripheral wall, said ribs being elongated and extending along lines generally radially outward from the center point of said bottom panel, said ribs rigidifying said bottom panel, enhancing the heat transfer surface thereof, and defining a support surface elevated from said bottom panel.

3. The apparatus of claim 2 wherein said partition wall is rectangular, defining four right angular corners and four wall sections, selected ones of said ribs extending from each of said corners inwardly to the center point of the bottom panel, others of said ribs projecting outwardly from the center point of the bottom panel on lines substantially perpendicular to the four wall sections, and a further set of ribs extending inwardly from said peripheral wall to the center point to each side of each of the first mentioned ribs.

4. The apparatus of claim 3 in combination with a drip pan supported directly on said ribs in overlying spaced relation to said bottom panel, and a food rack mounted over and supported on said drip pan.

5. The apparatus of claim 4 including a base support underlying said base and maintaining said base in an elevated position, said base support defining an open area generally coextensive with the area within the peripheral wall for the accommodation of fuel containers within said base support, said base support having an access opening therein to enable access to the area below the supported base.

6. The apparatus of claim 2 wherein said base and lid are formed of cast aluminum, said side wall, said peripheral wall, and said ribs being formed integrally with said bottom panel.

7. For use in a portable food smoker in combination with a chamber defining lid, a base, said base comprising a planar bottom panel, a side wall projecting upwardly from said bottom panel peripherally thereabout, said side wall having a top edge, an inwardly directed lid receiving support ledge defined along the top edge of said side wall, a partition wall projecting upwardly from said bottom panel in inwardly spaced relation to said side wall, said partition wall being generally coextensive with said side wall and defining a moisture retaining channel between the partition wall and the side wall inward of said support ledge, and multiple ribs projecting upwardly from said bottom panel within said peripheral wall, said ribs being elongated and defining an elevated support above said bottom panel.

8. The base of claim 7 wherein said ribs are elongated and extend along lines projecting generally radially outward from the center point of the bottom panel.

9. The base of claim 8 wherein said bottom panel is rectangular.

* * * * *